(12) United States Patent
Uemura et al.

(10) Patent No.: US 11,134,178 B2
(45) Date of Patent: Sep. 28, 2021

(54) VIDEO SIGNAL OUTPUT APPARATUS, CONTROL METHOD, AND RECORDING MEDIUM

(71) Applicant: Panasonic Intellectual Property Management Co., Ltd., Osaka (JP)

(72) Inventors: Toshiaki Uemura, Osaka (JP); Yoshihiro Moriie, Osaka (JP); Shinji Takeda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/055,087

(22) PCT Filed: Apr. 3, 2019

(86) PCT No.: PCT/JP2019/014844
§ 371 (c)(1),
(2) Date: Nov. 12, 2020

(87) PCT Pub. No.: WO2020/044644
PCT Pub. Date: Mar. 5, 2020

(65) Prior Publication Data
US 2021/0127039 A1    Apr. 29, 2021

(30) Foreign Application Priority Data
Aug. 30, 2018  (JP) .............................. JP2018-160910

(51) Int. Cl.
*H04N 5/04* (2006.01)
*G06F 3/16* (2006.01)
(Continued)

(52) U.S. Cl.
CPC .............. *H04N 5/04* (2013.01); *G06F 3/162* (2013.01); *G10L 21/055* (2013.01); *G11B 27/10* (2013.01);
(Continued)

(58) Field of Classification Search
USPC ................................ 386/200–234, 239–248
See application file for complete search history.

(56) References Cited

U.S. PATENT DOCUMENTS

| 8,954,496 B2 * | 2/2015 | Sukeno | G09G 5/008 |
| | | | 709/203 |
| 2010/0067877 A1 * | 3/2010 | Ichimura | H04N 21/44004 |
| | | | 386/239 |

(Continued)

FOREIGN PATENT DOCUMENTS

| JP | 2010-011274 A | 1/2010 |
| JP | 2013-115782 A | 6/2013 |
| JP | 2017-063392 A | 3/2017 |

OTHER PUBLICATIONS

International Search Report issued in corresponding International Patent Application No. PCT/JP2019/01418441, dated Jun. 18, 2019, with English translation.

(Continued)

*Primary Examiner* — Hung Q Dang
(74) *Attorney, Agent, or Firm* — McDermott Will & Emery LLP

(57) ABSTRACT

A video signal output apparatus includes: an outputter that outputs a video signal and a first audio signal to each of output apparatuses; a receiver that receives a second audio signal generated as a result of each of the output apparatuses performing audio signal processing on the first audio signal; an synchronization information obtainer that obtains synchronization information indicating a time difference between a time required for video signal processing and a (Continued)

time required for the audio signal processing by each of the output apparatuses; a delay calculator that calculates a delay time for reducing a time difference between respective timings of displaying video by the output apparatuses, using a timing at which the receiver receives the second audio signal from each of the output apparatuses and the synchronization information obtained; and a delayer that delays the video signal and the first audio signal, by the delay time calculated.

7 Claims, 7 Drawing Sheets

(51) Int. Cl.
| | |
|---|---|
| G10L 21/055 | (2013.01) |
| G11B 27/10 | (2006.01) |
| H04N 5/60 | (2006.01) |
| H04N 7/015 | (2006.01) |
| H04R 3/12 | (2006.01) |
| H04N 21/442 | (2011.01) |
| G09G 5/00 | (2006.01) |
| H04N 21/436 | (2011.01) |
| H04N 21/43 | (2011.01) |

(52) U.S. Cl.
CPC ............ *H04N 5/607* (2013.01); *H04N 7/015* (2013.01); *H04R 3/12* (2013.01)

(56) References Cited

U.S. PATENT DOCUMENTS

| | | | | |
|---|---|---|---|---|
| 2012/0155657 | A1* | 6/2012 | Takao | H04W 52/0229 |
| | | | | 381/57 |
| 2013/0135526 | A1 | 5/2013 | Minemura | |
| 2014/0010515 | A1* | 1/2014 | Lee | H04L 65/605 |
| | | | | 386/207 |
| 2015/0077633 | A1* | 3/2015 | Lee | H04N 21/4307 |
| | | | | 348/515 |
| 2015/0138038 | A1* | 5/2015 | Nam | G06F 3/1446 |
| | | | | 345/1.3 |
| 2017/0289608 | A1 | 10/2017 | Liu | |

OTHER PUBLICATIONS

Extended European Search Report dated Jul. 21, 2021 for the counterpart European Patent Application No. 19856151.6.

* cited by examiner

VIDEO SIGNAL OUTPUT APPARATUS, CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2019/014844, filed on Apr. 3, 2019, which in turn claims the benefit of Japanese Patent Application No. 2018-160910, dated Aug. 30, 2018, the entire disclosures of which Applications are incorporated by reference herein.

TECHNICAL FIELD

The present disclosure relates to a video signal output apparatus, a control method, and a recording medium.

BACKGROUND ART

PTL 1 discloses a method of matching output timings of video and audio output from a plurality of reproduction apparatuses.

With the method disclosed in PTL 1, the time difference between the respective timings at which a first reproduction apparatus and a second reproduction apparatus output audio by speakers is detected through sound collection by a microphone, and the audio output timing of the first reproduction apparatus or the second reproduction apparatus is controlled based on the detected time difference. Moreover, whether to control the audio output timing is selectively determined based on the positional relationship between the first reproduction apparatus and the second reproduction apparatus. Thus, the output timing of one of the first reproduction apparatus and the second reproduction apparatus is matched to the output timing of the other one of the first reproduction apparatus and the second reproduction apparatus.

CITATION LIST

Patent Literature

PTL 1: Japanese Unexamined Patent Application Publication No. 2013-115782

SUMMARY OF THE INVENTION

Technical Problem

The present disclosure provides a video signal output apparatus that controls video output timings of a plurality of output apparatuses.

Solutions to Problem

A video signal output apparatus according to an aspect of the present disclosure is a video signal output apparatus connected to a plurality of output apparatuses each of which performs video signal processing for displaying video and audio signal processing for outputting audio, the video signal output apparatus including: an outputter that outputs a video signal and a first audio signal to each of the plurality of output apparatuses; a receiver that receives a second audio signal generated as a result of each of the plurality of output apparatuses performing the audio signal processing on the first audio signal output by the outputter; an obtainer that obtains synchronization information indicating a time difference between a time required for the video signal processing and a time required for the audio signal processing by each of the plurality of output apparatuses; a delay calculator that calculates a delay time for reducing a time difference between respective timings of displaying the video by the plurality of output apparatuses, using a timing at which the receiver receives the second audio signal from each of the plurality of output apparatuses and the synchronization information obtained by the obtainer; and a delayer that delays the video signal and the first audio signal to be output by the outputter, by the delay time calculated by the delay calculator.

A control method according to an aspect of the present disclosure is a control method performed by a video signal output apparatus connected to a plurality of output apparatuses each of which performs video signal processing for displaying video and audio signal processing for outputting audio, the control method including: outputting a video signal and a first audio signal to each of the plurality of output apparatuses; receiving a second audio signal generated as a result of each of the plurality of output apparatuses performing the audio signal processing on the first audio signal output; obtaining synchronization information indicating a time difference between a time required for the video signal processing and a time required for the audio signal processing by each of the plurality of output apparatuses; calculating a delay time for reducing a time difference between respective timings of displaying the video by the plurality of output apparatuses, using a timing at which the second audio signal is received from each of the plurality of output apparatuses and the synchronization information obtained; and delaying the video signal and the first audio signal by the delay time calculated.

A recording medium according to an aspect of the present disclosure is a non-transitory computer-readable recording medium having a program recorded thereon for causing a computer to execute the foregoing control method.

Advantageous Effect of Invention

A video signal output apparatus according to the present disclosure can control video output timings of a plurality of output apparatuses.

DESCRIPTION OF EXEMPLARY EMBODIMENT

Figure 1:
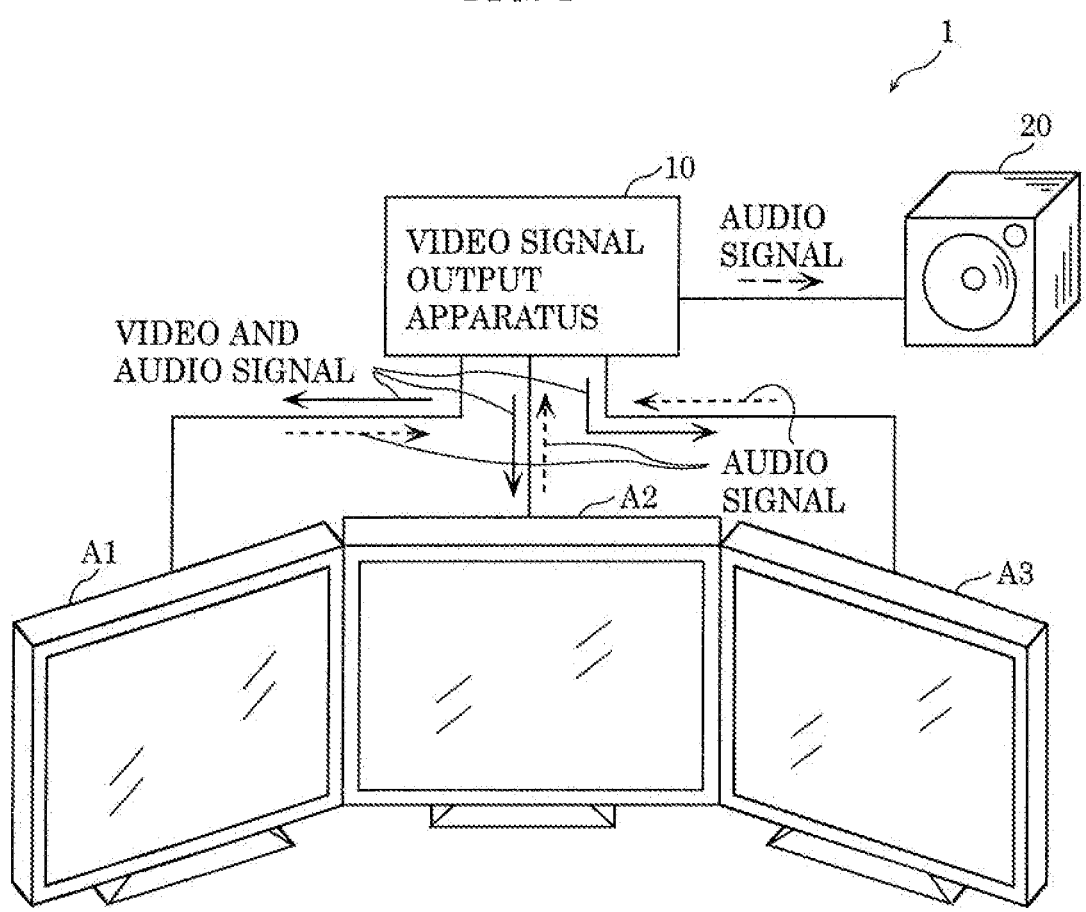
FIG. 1 is a schematic diagram of a video output system according to an embodiment.

A video signal output apparatus according to an aspect of the present disclosure is a video signal output apparatus connected to a plurality of output apparatuses each of which performs video signal processing for displaying video and audio signal processing for outputting audio, the video signal output apparatus including: an outputter that outputs a video signal and a first audio signal to each of the plurality of output apparatuses; a receiver that receives a second audio signal generated as a result of each of the plurality of output apparatuses performing the audio signal processing on the first audio signal output by the outputter; an obtainer that obtains synchronization information indicating a time difference between a time required for the video signal processing and a time required for the audio signal processing by each of the plurality of output apparatuses; a delay calculator that calculates a delay time for reducing a time difference between respective timings of displaying the video by the plurality of output apparatuses, using a timing at which the receiver receives the second audio signal from each of the plurality of output apparatuses and the synchronization information obtained by the obtainer; and a delayer that delays the video signal and the first audio signal to be output by the outputter, by the delay time calculated by the delay calculator.

According to this aspect, the video signal output apparatus delays the video signal output to each of the plurality of output apparatuses, using the measured value of the difference in the time required for the audio signal processing between the plurality of output apparatuses and the time difference between the video signal processing and the audio signal processing by each output apparatus. The respective timings of displaying the video based on the video signal by the plurality of output apparatuses are not used here. Thus, the video signal output apparatus can reduce the time difference between the respective timings of displaying the video after the video signal processing by the plurality of output apparatuses, without using information about the respective timings of displaying the video by the plurality of output apparatuses. Since the time difference in video display between the plurality of output apparatuses is relatively small, for a user viewing the video displayed by the plurality of output apparatuses, the sense of incongruity when viewing the video is reduced and the viewing effect is enhanced as compared with the case where the time difference is relatively large. Thus, the video signal output apparatus controls the video output timings of the plurality of output apparatuses.

The delay calculator may calculate the delay time to reduce the time difference between the respective timings of displaying the video by the plurality of output apparatuses to zero, using the timing and the synchronization information.

According to this aspect, the video signal output apparatus delays the video signal output to each of the plurality of output apparatuses, to reduce the time difference between the respective timings of displaying the video by the plurality of output apparatuses to zero. Since the time difference in video display between the plurality of output apparatuses is zero, the sense of incongruity when viewing video is further reduced and the viewing effect is further enhanced for the user, as compared with the case where the time difference is not zero.

The outputter may convert the video signal and the first audio signal to be output to each of the plurality of output apparatuses into a form suitable for a display mode of the output apparatus, and output the video signal and the first audio signal converted, and the delay calculator may calculate the delay time, when the form into which the outputter converts the video signal and the first audio signal changes.

According to this aspect, the video signal output apparatus calculates and updates the delay time by which the video signal output by the outputter is delayed, in the case where the display mode of the output apparatus is changed. Therefore, even in the case where the display mode of the output apparatus is changed, the time difference in video display between the plurality of output apparatuses can be reduced by delaying the video signal using the delay time suitable for the changed display mode. Thus, the video signal output apparatus controls the video output timings of the plurality of output apparatuses even in the case where the display mode of the output apparatus is changed.

The video signal output apparatus may further include: an audio outputter that delays the second audio signal received by the receiver from one output apparatus selected from the plurality of output apparatuses by a delay time corresponding to the time difference indicated by the synchronization information of the one output apparatus, and outputs, to outside, the second audio signal delayed.

According to this aspect, the video signal output apparatus outputs the second audio signal received from the output apparatus, as audio using a speaker or the like. Since the time difference in video display between the plurality of output apparatuses is controlled to be relatively small, by outputting the audio signal delayed according to the timing of displaying the video by the selected output apparatus, the audio can be output synchronously with the video displayed by each output apparatus.

The outputter may output the video signal and the first audio signal in accordance with High-Definition Multimedia Interface (HDMI® (registered trademark)) standard, and the receiver may receive the second audio signal by an audio return channel (ARC) in the HDMI® standard.

According to this aspect, the video signal output apparatus can be connected to each output apparatus by one HDMI® cable. Hence, the video signal output apparatus can control the video output timings of the plurality of output apparatuses, with no need for any cable other than the one HDMI® cable or any other communication means.

A control method according to an aspect of the present disclosure is a control method performed by a video signal output apparatus connected to a plurality of output apparatuses each of which performs video signal processing for displaying video and audio signal processing for outputting audio, the control method including: outputting a video signal and a first audio signal to each of the plurality of output apparatuses; receiving a second audio signal generated as a result of each of the plurality of output apparatuses performing the audio signal processing on the first audio signal output; obtaining synchronization information indicating a time difference between a time required for the video signal processing and a time required for the audio signal processing by each of the plurality of output apparatuses; calculating a delay time for reducing a time difference between respective timings of displaying the video by the plurality of output apparatuses, using a timing at which the second audio signal is received from each of the plurality of output apparatuses and the synchronization information obtained; and delaying the video signal and the first audio signal by the delay time calculated.

According to this aspect, the same effects as the foregoing video signal output apparatus can be achieved.

A recording medium according to an aspect of the present disclosure is a non-transitory computer-readable recording medium having a program recorded thereon for causing a computer to execute the foregoing control method.

According to this aspect, the same effects as the foregoing video signal output apparatus can be achieved.

An embodiment will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

EMBODIMENT

This embodiment describes a video signal output apparatus, etc. that control video output timings of a plurality of output apparatuses.

FIG. 1 is a schematic diagram of video output system 1 according to this embodiment.

As illustrated in FIG. 1, video output system 1 includes video signal output apparatus 10, output apparatuses A1, A2, and A3, and speaker 20. Output apparatuses A1, A2, and A3 are also referred to as "output apparatus A1, etc."

Video signal output apparatus 10 is an apparatus that outputs a video signal and an audio signal of content. Video signal output apparatus 10 is connected to output apparatus A1, etc., and outputs a video signal and an audio signal to each of output apparatus A1, etc. at an appropriate timing. Video signal output apparatus 10 is also connected to speaker 20, and outputs an audio signal to speaker 20. Video signal output apparatus 10 and each of output apparatus A1, etc. are connected by a cable conforming to a standard for transmission of video signals and audio signals. Although this embodiment describes the case where the cable is an HDMI® cable for transmitting and receiving video signals and audio signals through communication according to the High-Definition Multimedia Interface (HDMI®) standard, the present disclosure is not limited to such.

Output apparatus A1 is an output apparatus that obtains a video signal and an audio signal of content and displays video based on the video signal. Output apparatus A1 includes a display screen, a video signal processing circuit, and an audio signal processing circuit. Output apparatus A1 performs video signal processing on the obtained video signal to generate a video signal in a form displayable on the display screen, and displays video on the display screen. The display screen is capable of displaying video in a predetermined display mode. The display mode is information indicating the display mode of the display screen, and is defined by a plurality of parameters such as resolution and refresh rate.

Output apparatus A1 also performs audio signal processing on the obtained audio signal to generate an audio signal in a form outputtable by the speaker, and transmits the generated audio signal to video signal output apparatus 10. For example, the audio signal is transmitted from output apparatus A1 to video signal output apparatus 10 by an audio return channel (ARC) in the HDMI® standard. In this case, the audio signal can be transmitted using the HDMI® cable connecting video signal output apparatus 10 and output apparatus A1. The audio signal may be transmitted using an optical audio cable, an RCA cable, or the like.

Output apparatuses A2 and A3 are each an output apparatus having the same functions as output apparatus A1. Output apparatuses A2 and A3 can each display video in a display mode independent of output apparatus A1. In detail, output apparatuses A1, A2, and A3 may display video in the same display mode, or at least one of output apparatuses A1, A2, and A3 may display video in a display mode different from the other output apparatuses. The processing capacities of output apparatus A1, etc. for video signal processing and audio signal processing may be different from each other.

Although an example in which the number of output apparatus A1, etc. is three is described here, the same description applies even when the number of output apparatus A1, etc. is two, or four or more.

Speaker 20 is a speaker that outputs audio. Speaker 20 obtains an audio signal output from video signal output apparatus 10, and outputs audio into the air based on the obtained audio signal. Video signal output apparatus 10 may include speaker 20, or output apparatus A1, etc. may include speaker 20. Speaker 20 is not an essential structural element.

Output apparatus A1, etc. each display video in an independent display mode, and may differ from each other in processing capacity. Accordingly, even if video signal output apparatus 10 simultaneously outputs the video signal, the video display timing is different between output apparatus A1, etc. The time difference can be, for example, about 100 msec to 1 sec. Video signal output apparatus 10 controls the output timings of video output to output apparatus A1, etc., in order to cause output apparatus A1, etc. to display video at the same timing. Specifically, video signal output apparatus 10 delays the video signal and the like to be output to each of output apparatus A1, etc. by an appropriate delay time and outputs the delayed video signal and the like, thus synchronizing the video display timings of output apparatus A1, etc.

Figure 2:
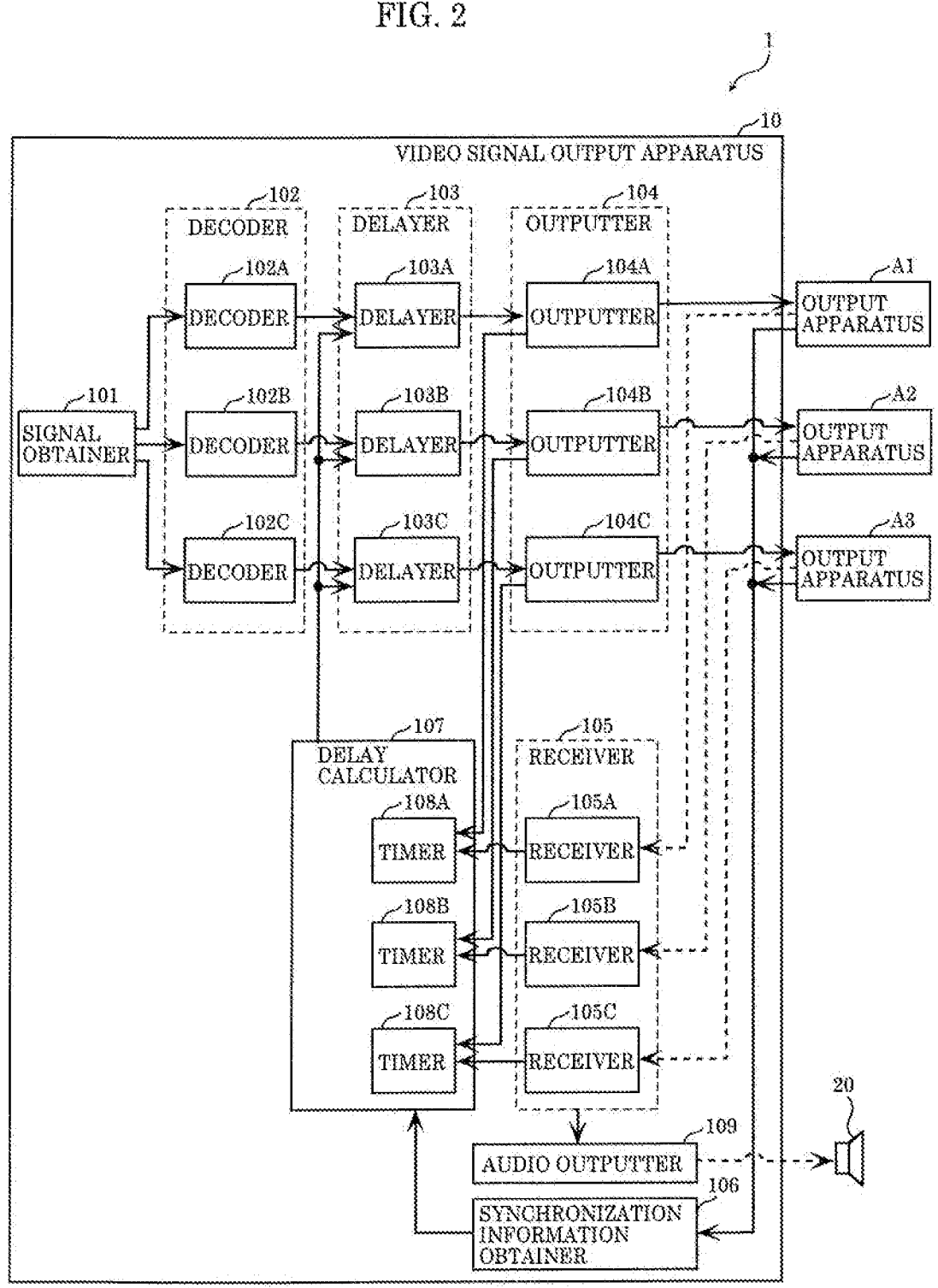
FIG. 2 is a block diagram illustrating a functional structure of a video signal output apparatus according to the embodiment.

FIG. 2 is a block diagram illustrating a functional structure of video signal output apparatus 10 according to this embodiment.

As illustrated in FIG. 2, video signal output apparatus 10 includes signal obtainer 101, decoder 102, delayer 103, outputter 104, receiver 105, synchronization information obtainer 106, delay calculator 107, and audio outputter 109.

Signal obtainer 101 is an obtainer that obtains a video signal and an audio signal. For example, signal obtainer 101 obtains the video signal and the audio signal by generating data relating to content by arithmetic processing, by receiving a broadcast wave including the content from outside of video signal output apparatus 10, or by reading data relating to the content stored in a storage device in video signal output apparatus 10. The video signal and the audio signal obtained by signal obtainer 101 may or may not be encoded.

Signal obtainer 101 provides the obtained video signal and audio signal to decoder 102. In more detail, signal obtainer 101 replicates the video signal and the audio signal and provides them to each of decoder 102A, etc. in decoder 102.

Decoder 102 is a signal processor that decodes the video signal and the audio signal obtained by signal obtainer 101. Decoder 102 includes decoders 102A, 102B, and 102C (hereafter also referred to as "decoder 102A, etc.") respectively corresponding to output apparatus A1, etc. Decoder 102A, etc. are each implemented by a decode circuit or by a processor executing a predetermined program.

Decoder 102A, etc. each decode the video signal and the audio signal obtained by signal obtainer 101, in the case where the video signal and the audio signal obtained by signal obtainer 101 are encoded. In the case where the video signal and the audio signal obtained by signal obtainer 101 are not encoded, decoder 102 is unnecessary.

Delayer 103 is a processor that delays, for each output destination, the video signal and the audio signal output by outputter 104. Delayer 103 includes delayers 103A, 103B, and 103C (hereafter also referred to as "delayer 103A, etc.") respectively corresponding to output apparatus A1, etc. Delayer 103A, etc. are each implemented by a dedicated circuit or by a processor executing a predetermined program.

As a time (delay time) by which each of delayer 103A, etc. delays the signals, a value independent for each of delayer 103A, etc. is calculated by delay calculator 107 and set. The delay time in each of delayer 103A, etc. is initially set to zero, and subsequently can be changed as a result of setting by delay calculator 107.

Outputter 104 is a processor that is connected to output apparatus A1, etc. and outputs the video signal and the audio signal to each of output apparatus A1, etc. Outputter 104 includes outputters 104A, 104B, and 104C (hereafter also referred to as "outputter 104A, etc.") respectively corresponding to output apparatus A1, etc.

The timing at which each of outputter 104A, etc. outputs the video signal and the audio signal to the corresponding one of output apparatus A1, etc. can be delayed by the corresponding one of delayer 103A, etc. Specifically, each of outputter 104A, etc. simultaneously outputs the video signal and the audio signal to the corresponding one of output apparatus A1, in the case where the delay time by the corresponding one of delayer 103A, etc. is zero. In the case where the delay time by the corresponding one of delayer 103A, etc. is greater than zero, each of outputter 104A, etc. outputs the video signal and the audio signal at a timing delayed by the delay time. The audio signal output by each of outputter 104A, etc. is also referred to as "first audio signal".

Each of outputter 104A, etc. selects one display mode from display modes supported by the connected one of output apparatus A1, etc., and converts the video signal decoded by decoder 102 into a form corresponding to the selected display mode and outputs the converted video signal.

Although an example in which outputter 104A, etc. include a communication interface device conforming to the HDMI® standard is described here, outputter 104A, etc. may conform to any other communication standard. In the case where each of outputter 104A, etc. conforms to the HDMI® standard, the display modes supported by the corresponding one of output apparatus A1, etc. are obtained by obtaining Extended Display Identification Data (EDID) from the output apparatus upon establishment of connection with the output apparatus. For example, outputter 104A, etc. may conform to, other than the HDMI® standard, a wireless LAN communication standard such as the IEEE 802.11a/b/g/n standard or a wired LAN communication standard such as the IEEE 802.3 standard.

In the case where the display modes in the connected one of output apparatus A1, etc. are changed, each of outputter 104A, etc. selects one of the new display modes.

Receiver 105 is a processor that receives an audio signal from each of output apparatus A1, etc. Receiver 105 includes receivers 105A, 105B, and 105C (hereafter also referred to as "receiver 105A, etc.") respectively corresponding to output apparatus A1, etc. The audio signal received by each of receiver 105A, etc. is an audio signal transmitted from the corresponding one of output apparatus A1, etc. after the output apparatus receives the first audio signal output by the corresponding one of outputter 104A, etc. The audio signal received by each of receiver 105A, etc. may be an audio signal generated as a result of the corresponding one of output apparatus A1, etc. performing audio signal processing on the first audio signal output by the corresponding one of outputter 104A, etc. Such an audio signal received by each of receiver 105A, etc. is also referred to as "second audio signal".

Synchronization information obtainer 106 is a processor that obtains synchronization information indicating the time difference between the time required for video signal processing and the time required for audio signal processing by each of output apparatus A1, etc. Synchronization information obtainer 106 is, for example, implemented by a processor executing a predetermined program. Synchronization information obtainer 106 may obtain the synchronization information from each of output apparatus A1, etc., or from another information source (e.g. a server on the Internet). Typically, the time required for video signal processing is longer than the time required for audio signal processing. Hence, the synchronization information corresponds to the difference time obtained by subtracting the time required for audio signal processing from the time required for video signal processing by each of output apparatus A1, etc. The synchronization information is information defined in correspondence with the display mode currently employed by each of output apparatus A1, etc., and is information specific to each of output apparatus A1, etc. The synchronization information is, for example, a value of about 100 msec to 1 sec, and is also commonly called "lip sync information".

Delay calculator 107 is a processor that calculates each delay time of delayer 103. Delay calculator 107 is, for example, implemented by a processor executing a predetermined program. Delay calculator 107 calculates the delay time so as to reduce the time difference between the respective timings of outputting video by output apparatus A1, etc., using the timing at which each of receiver 105A, etc. receives the second audio signal from the corresponding one of output apparatus A1, etc. and the synchronization information obtained by synchronization information obtainer 106.

More specifically, delay calculator 107 includes timers 108A, 108B, and 108C. Timer 108A obtains the timing of outputter 104A outputting the video signal and the first audio signal to output apparatus A1 and the timing of receiver 105A receiving the second audio signal from output apparatus A1, and calculates the time difference between the timings. Timers 108B and 108C perform the same process as timer 108A, respectively for output apparatuses A2 and A3.

Delay calculator 107 measures, using each of timer 108A, etc., the time from the timing of the corresponding one of outputter 104A, etc. outputting the video signal and the first audio signal to the timing of the corresponding one of receiver 105A, etc. receiving the second audio signal. Delay calculator 107 then calculates the delay time so as to reduce the time difference between the respective timings of outputting video by output apparatus A1, etc., and in particular reduce the time difference to zero, using the times measured by timer 108A, etc. and the synchronization information.

Delay calculator 107 may calculate the delay time in the case where the form into which each of outputter 104A, etc. performs conversion changes. By calculating the delay time in this way, delay calculator 107 updates the delay time that has been set before the calculation.

Audio outputter 109 is a processor that outputs audio based on the second audio signal received from one of output apparatus A1, etc. Audio outputter 109 delays the second audio signal transmitted from one output apparatus selected from output apparatus A1, etc. and received by the corresponding one of receiver 105A, etc. by a delay time corresponding to the time difference indicated by the synchronization information of the one output apparatus, and outputs the delayed second audio signal to outside. The second audio signal is output, for example, to speaker 20.

For example, in the case where output apparatus A2 is selected from output apparatus A1, etc., audio outputter 109 delays, from the time at which the second audio signal is received from output apparatus A2, the second audio signal received from output apparatus A2 by a delay time corresponding to the time difference indicated by the synchronization information of output apparatus A2, and outputs the delayed second audio signal to speaker 20. In the case where video output system 1 does not include speaker 20, audio outputter 109 is unnecessary.

The video signal and the audio signal provided by signal obtainer 101 may be a video signal and an audio signal relating to content for viewing by the user. Alternatively, the video signal and the audio signal provided by signal obtainer 101 may be test content for timing adjustment (i.e. content not for viewing) in an initial stage, i.e. until the delay time calculated by delay calculator 107 based on the video signal, etc. provided by signal obtainer 101 is set in delayer 103, and be switched to content for viewing after the delay time is set in delayer 103.

Figure 3:
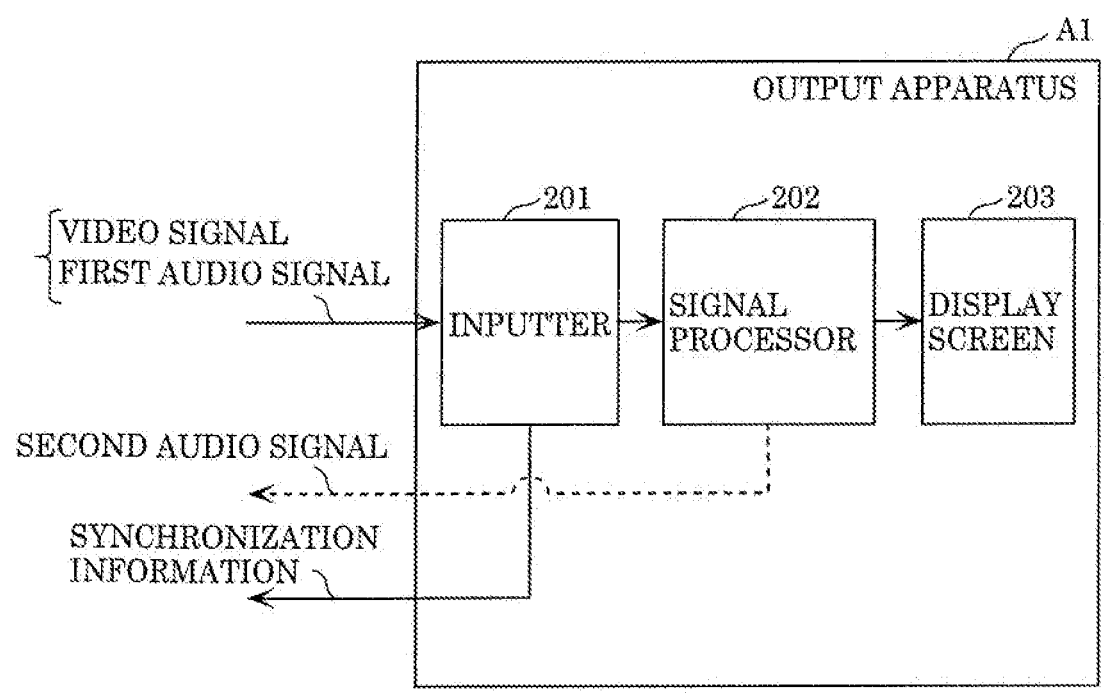
FIG. 3 is a block diagram illustrating a functional structure of an output apparatus according to the embodiment.

FIG. 3 is a block diagram illustrating a functional structure of output apparatus A1 according to this embodiment.

As illustrated in FIG. 3, output apparatus A1 includes inputter 201, signal processor 202, and display screen 203. Output apparatus A1 is an output apparatus that performs video signal processing for displaying video and audio signal processing for outputting audio.

Inputter 201 is a processor that is connected to video signal output apparatus 10 and receives the video signal and the first audio signal output from video signal output apparatus 10. Inputter 201 includes a communication interface device conforming to the same communication standard as outputter 104 in video signal output apparatus 10, and transmits and receives signals conforming to the communication standard. In the case where outputter 104 conforms to the HDMI® standard, inputter 201 conforms to the HDMI® standard, too. Moreover, inputter 201 provides the synchronization information indicating the time difference between the time required for video signal processing and the time required for audio signal processing by output apparatus A1, to video signal output apparatus 10. The synchronization information is provided, for example, upon establishing the connection with video signal output apparatus 10.

Signal processor 202 is a processor that performs video signal processing and audio signal processing respectively on the video signal and the first audio signal received by inputter 201. Signal processor 202 includes a video signal processing circuit, and performs video signal processing for displaying video using the video signal processing circuit. Signal processor 202 also includes an audio signal processing circuit, and performs audio signal processing for outputting audio using the audio signal processing circuit. Having completed the video signal processing, signal processor 202 provides the video signal resulting from the video signal processing to display screen 203, to display an image on display screen 203. Having completed the audio signal processing, signal processor 202 transmits the second audio signal resulting from the audio signal processing to video signal output apparatus 10. For example, the second audio signal is transmitted by an ARC in the HDMI® standard.

Display screen 203 is a display device that displays an image. Display screen 203 displays the image relating to the content, based on the video signal provided from signal processor 202.

The time from when the video signal is input to inputter 201 to when the video corresponding to the input video signal is displayed on display screen 203 is also referred to as "time required for video signal processing". The time from when the first audio signal is input to inputter 201 to when the second audio signal obtained by converting the input first audio signal is output by signal processor 202 is also referred to as "time required for audio signal processing".

The functional structure of each of output apparatuses A2 and A3 is the same as the functional structure of output apparatus A1, and accordingly its description is omitted.

Figure 4:
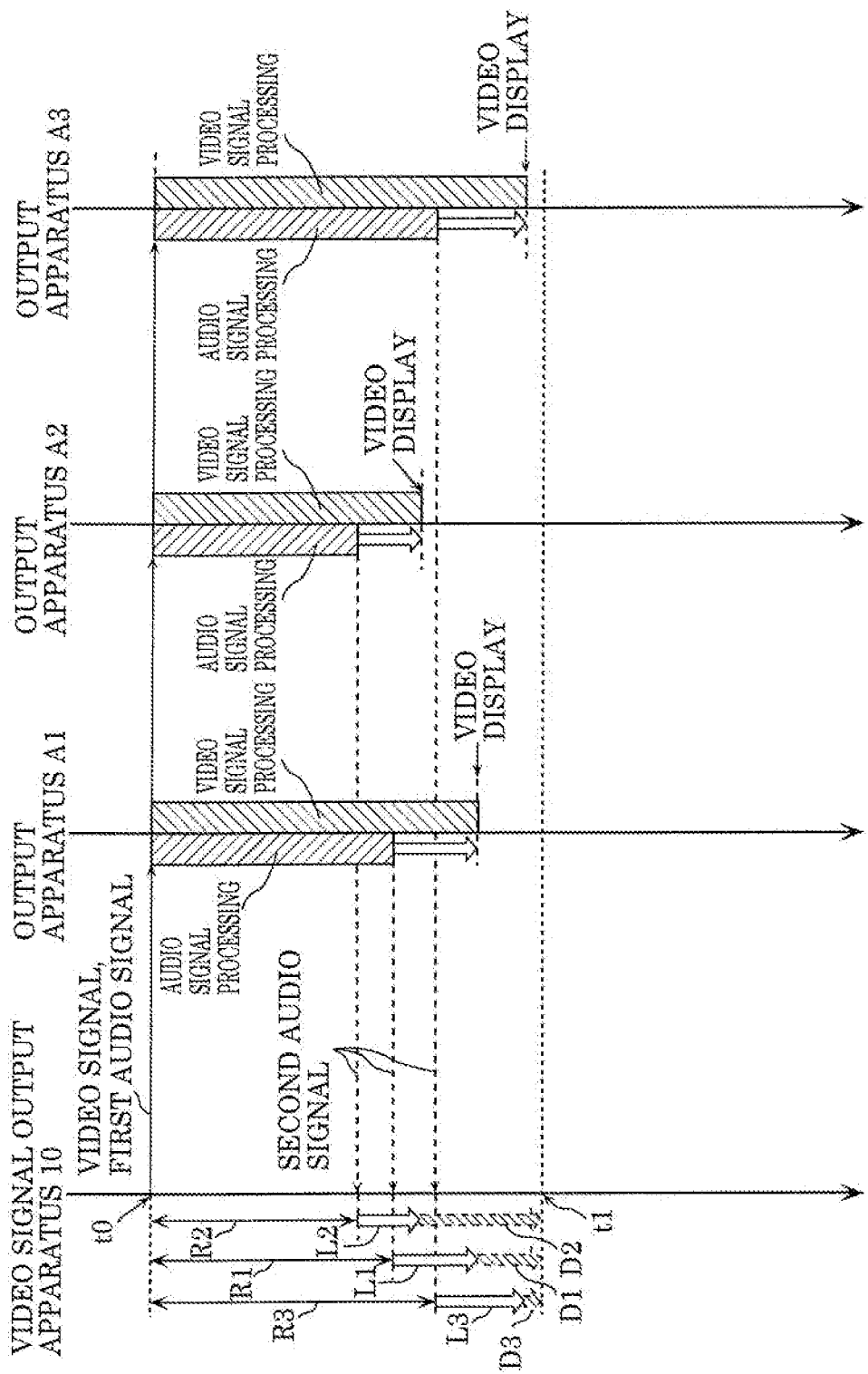
FIG. 4 is a first sequence diagram illustrating processing timings of the video signal output apparatus and output apparatuses according to the embodiment.

FIG. 4 is a first sequence diagram illustrating processing timings of video signal output apparatus 10 and output apparatus A1, etc. according to this embodiment. FIG. 4 illustrates the case where the delay time set in delayer 103A, etc. is zero.

FIG. 4 illustrates the case where outputter 104 in video signal output apparatus 10 outputs a video signal and a first audio signal to each of output apparatus A1, etc. at time t0.

When outputter 104 outputs the video signal and the first audio signal, each of output apparatus A1, etc. receives the video signal and the first audio signal by inputter 201. Signal processor 202 performs audio signal processing on the input first audio signal to generate a second audio signal, and transmits the second audio signal to video signal output apparatus 10. Signal processor 202 also performs video signal processing on the input video signal, and displays video on display screen 203.

Video signal output apparatus 10 measures the time from time t0 to when the second audio signal is received from each of output apparatuses A1, A2, and A3, thus obtaining times R1, R2, and R3.

Video signal output apparatus 10 also obtains times L1, L2, and L3 as synchronization information of output apparatuses A1, A2, and A3 respectively.

Delay calculator 107 calculates a delay time by each of delayer 103A, etc., using time R1, etc. and time L1, etc. Specifically, delay calculator 107 determines respective delay times D1, D2, and D3 of delayers 103A, 103B, and 103C so that the sum of time R1, time L1, and delay time D1, the sum of time R2, time L2, and delay time D2, and the sum of time R3, time L3, and delay time D3 will be equal to one another as defined in the following Equation 1. Delay calculator 107 sets the calculated delay times in delayer 103A, etc.

$$R1+L1+D1=R2+L2+D2=R3+L3+D3 \quad \text{(Equation 1)}.$$

Figure 5:
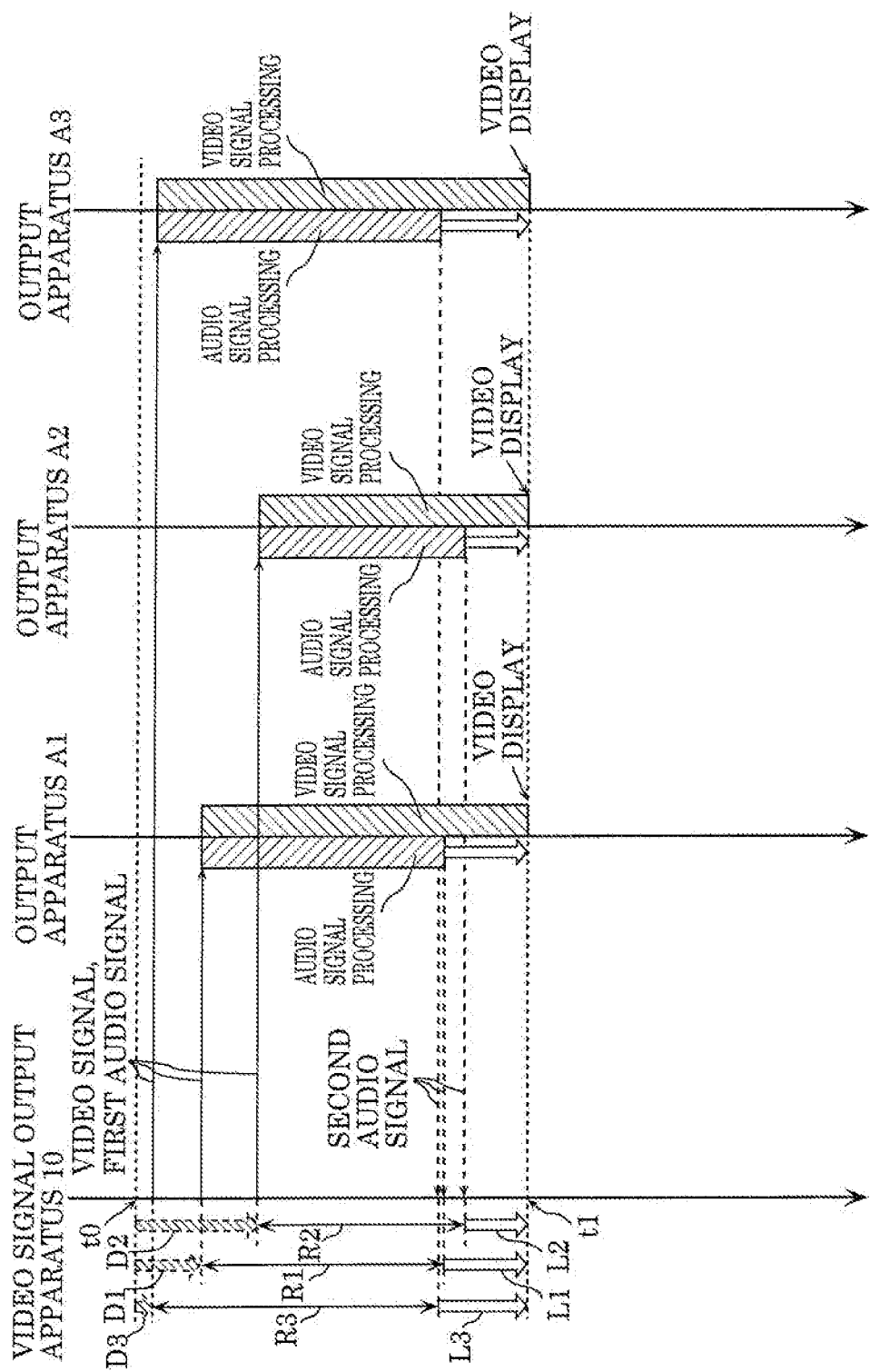
FIG. 5 is a second sequence diagram illustrating processing timings of the video signal output apparatus and the output apparatuses according to the embodiment.

FIG. 5 is a second sequence diagram illustrating processing timings of video signal output apparatus 10 and output apparatus A1, etc. according to this embodiment. FIG. 5 illustrates processing timings in the case where the delay times calculated by delay calculator 107 are set in delayer 103A, etc.

In FIG. 5, video signal output apparatus 10 delays a video signal and a first audio signal to be transmitted to output apparatus A1, etc. respectively by delay time D1, etc. by delayer 103A, etc., and outputs the delayed video signal and first audio signal. Consequently, output apparatus A1, etc. can display video on display screen 203 at the same timing, i.e. time t1, as a result of receiving the video signal and the first audio signal and performing video signal processing and audio signal processing.

There are an unlimited numbers of sets of delay times D1, D2, and D3 satisfying the foregoing Equation 1. This is because a set obtained by adding the same value to or subtracting the same value from each of delay times D1, D2, and D3 in the set also satisfies the foregoing Equation 1. Hence, delay calculator 107 may set the delay time corresponding to the largest one of (R1+L1), (R2+L2), and (R3+L3) to zero. For example, (R3+L3) is largest in FIG. 4, and accordingly D3 may be set to zero as in the following Equation 2.

$$R1+L1+D1=R2+L2+D2=R3+L3 \quad \text{(Equation 2)}.$$

This means that video display by other output apparatuses A1 and A2 is timed to coincide with the timing of video display by output apparatus A3 that is slowest in video display in the case where outputter 104A, etc. simultaneously output the video signal and the first audio signal.

Figure 6:
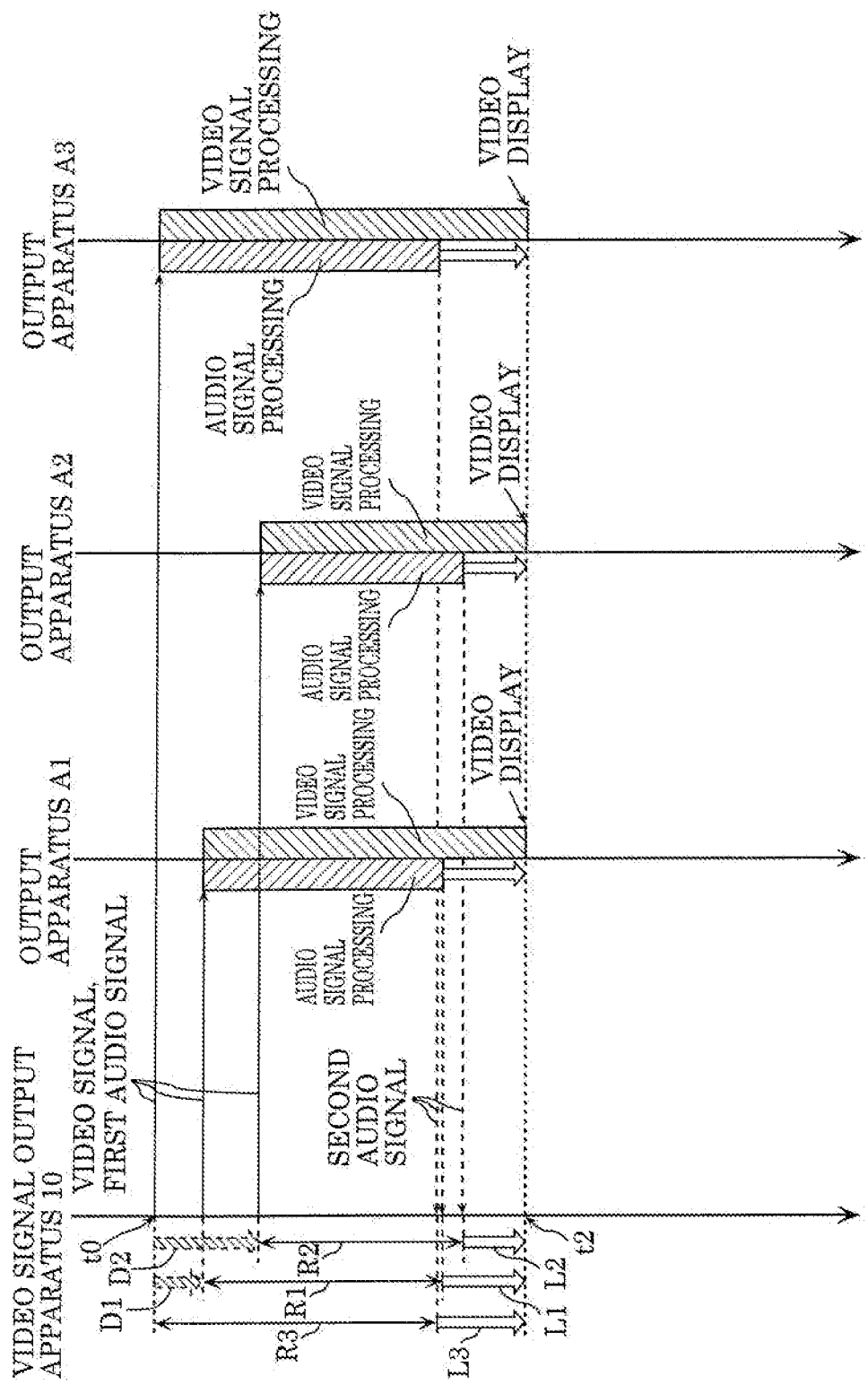
FIG. 6 is a third sequence diagram illustrating processing timings of the video signal output apparatus and the output apparatuses according to the embodiment.

FIG. 6 is a sequence diagram illustrating processing timings of video signal output apparatus 10 and output apparatus A1, etc. in the case where delay time D1, etc. are set in this way. Setting the processing timings as illustrated in FIG. 6 is advantageous in that output apparatus A1, etc. can simultaneously display video at time t2 that is the earliest timing of video display by output apparatus A1, etc. from among an unlimited number of sets of delay times D1, D2, and D3 satisfying the foregoing Equation 1.

A control method by video signal output apparatus 10 according to this embodiment will be described below.

Figure 7:
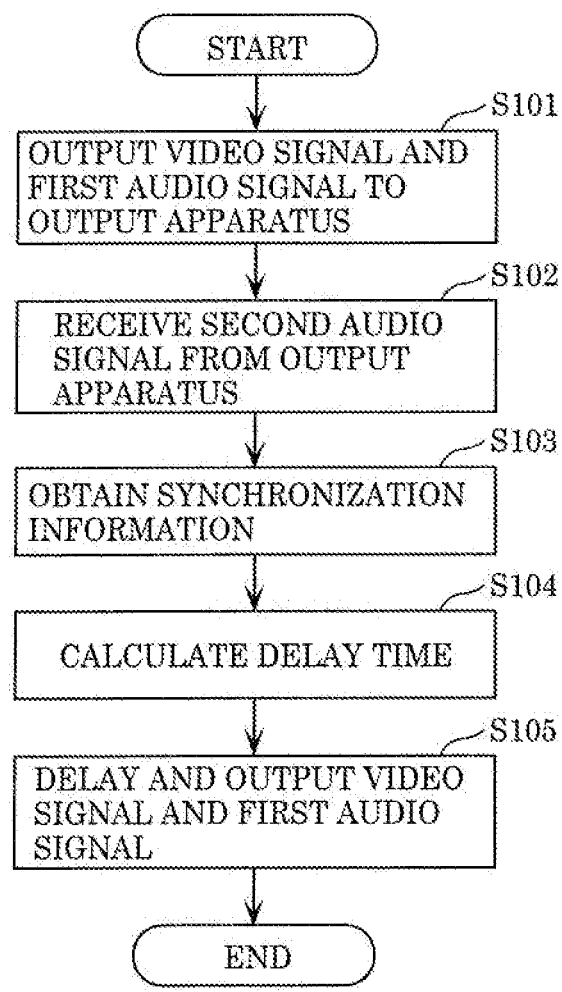
FIG. 7 is a flowchart illustrating a control method by the video signal output apparatus according to the embodiment.

FIG. 7 is a flowchart illustrating the control method by video signal output apparatus 10 according to this embodiment.

In Step S101, outputter 104A, etc. replicate a video signal and a first audio signal and simultaneously output the video signal and the first audio signal to output apparatus A1, etc. respectively. Such simultaneous output by outputter 104A, etc. is because the delay times set in delayer 103A, etc. are all zero.

In Step S102, receiver 105A, etc. each receive a second audio signal generated by the corresponding one of output apparatus A1, etc. performing audio signal processing on the first audio signal output by the corresponding one of outputter 104A, etc. in Step S101.

In Step S103, synchronization information obtainer 106 obtains synchronization information specific to each of output apparatus A1, etc. and indicating the time difference between video signal processing and audio signal processing.

In Step S104, delay calculator 107 calculates delay times by delayer 103A, etc. so as to reduce the time difference between the respective timings of outputting video by output apparatus A1, etc., using the respective timings at which receiver 105A, etc. receive the second audio signal from output apparatus A1, etc. in Step S102 and the synchronization information obtained by synchronization information obtainer 106 in Step S103.

In Step S105, delayer 103A, etc. delay the video signal and the first audio signal to be output by outputter 104A, etc. to the respective output destinations by the delay times calculated by delay calculator 107 in Step S104. Outputter 104A, etc. output the video signal and the first audio signal delayed by each of delayer 103A, etc.

Although the above describes the structure in which decoder 102 includes decoder 102A, etc., decoder 102 may have no such internal structure. In this case, signal obtainer 101 provides the obtained video signal and audio signal to decoder 102 without replicating the signals. Decoder 102 decodes the video signal and the audio signal obtained by signal obtainer 101, replicates the decoded video signal and audio signal, and provides the signals to each of delayer 103A, etc. The foregoing effects can equally be achieved even with this structure.

By the series of processes described above, video signal output apparatus 10 can cause output apparatus A1, etc. to simultaneously output video.

The video signal and the first audio signal output from video signal output apparatus 10 in a state in which the delay times of delayer 103A, etc. are zero are used by delay calculator 107 to calculate the delay times subsequently, and therefore a test video signal and a test first audio signal may be used as such video signal and first audio signal. For example, the test video signal is video in which figures of a predetermined color are arranged in a predetermined pattern. For example, the test first audio signal is audio having sound of a predetermined single scale.

As described above, the video signal output apparatus according to this embodiment delays the video signal output to each of the plurality of output apparatuses, using the measured value of the difference in the time required for the audio signal processing between the plurality of output apparatuses and the time difference between the video signal processing and the audio signal processing by each output apparatus. The respective timings of displaying the video based on the video signal by the plurality of output apparatuses are not used here. Thus, the video signal output apparatus can reduce the time difference between the respective timings of displaying the video after the video signal processing by the plurality of output apparatuses, without using information about the respective timings of displaying the video by the plurality of output apparatuses. Since the time difference in video display between the plurality of output apparatuses is relatively small, for a user viewing the video displayed by the plurality of output apparatuses, the sense of incongruity when viewing the video is reduced and the viewing effect is enhanced as compared with the case where the time difference is relatively large. Thus, the video signal output apparatus controls the video output timings of the plurality of output apparatuses.

The video signal output apparatus delays the video signal output to each of the plurality of output apparatuses, to reduce the time difference between the respective timings of displaying the video by the plurality of output apparatuses to zero. Since the time difference in video display between the plurality of output apparatuses is zero, the sense of incongruity when viewing video is further reduced and the viewing effect is further enhanced for the user, as compared with the case where the time difference is not zero.

The video signal output apparatus calculates and updates the delay time by which the video signal output by the outputter is delayed, in the case where the display mode of the output apparatus is changed. Therefore, even in the case where the display mode of the output apparatus is changed, the time difference in video display between the plurality of output apparatuses can be reduced by delaying the video signal using the delay time suitable for the changed display mode. Thus, the video signal output apparatus controls the video output timings of the plurality of output apparatuses even in the case where the display mode of the output apparatus is changed.

The video signal output apparatus outputs the second audio signal received from the output apparatus, as audio using a speaker or the like. Since the time difference in video display between the plurality of output apparatuses is controlled to be relatively small, by outputting the audio signal delayed according to the timing of displaying the video by the selected output apparatus, the audio can be output synchronously with the video displayed by each output apparatus.

The video signal output apparatus can be connected to each output apparatus by one HDMI® cable. Hence, the video signal output apparatus can control the video output timings of the plurality of output apparatuses, with no need for any cable other than the one HDMI® cable or any other communication means.

The foregoing embodiment has been described to illustrate the presently disclosed techniques, through the detailed description and the accompanying drawings.

The structural elements in the detailed description and the accompanying drawings may include not only the structural elements essential for the solution of the problem but also the structural elements not essential for the solution of the problem, to illustrate the presently disclosed techniques. The inclusion of such optional structural elements in the detailed description and the accompanying drawings therefore does not mean that these optional structural elements are essential structural elements.

The foregoing embodiment is intended to be illustrative of the presently disclosed techniques, and therefore various changes, replacements, additions, omissions, etc. can be made within the scope of the appended claims and their equivalents.

Industrial Applicability

The presently disclosed techniques are applicable to a video signal output apparatus that controls video output timings of a plurality of output apparatuses.

The invention claimed is:

1. A video signal output apparatus connected to a plurality of output apparatuses each of which performs video signal processing for displaying video and audio signal processing for outputting audio, the video signal output apparatus comprising:
   a first interface configured to output a video signal and a first audio signal to each of the plurality of output apparatuses;
   a second interface configured to receive a second audio signal generated as a result of each of the plurality of output apparatuses performing the audio signal processing on the first audio signal output by the first interface; and
   a signal processor configured to:
      obtain synchronization information indicating a time difference between a time required for the video signal processing and a time required for the audio signal processing by each of the plurality of output apparatuses;
      calculate a delay time for reducing a time difference between respective timings of displaying the video by the plurality of output apparatuses, using a timing at which the second interface receives the second audio signal from each of the plurality of output apparatuses and the synchronization information obtained; and
      delay the video signal and the first audio signal to be output by the first interface, by the delay time calculated.

2. The video signal output apparatus according to claim 1, wherein the the signal processor is configured to calculate the delay time to reduce the time difference between the respective timings of displaying the video by the plurality of output apparatuses to zero, using the timing and the synchronization information.

3. The video signal output apparatus according to claim 1, wherein the first interface is configured to convert the video signal and the first audio signal to be output to each of the plurality of output apparatuses into a form suitable for a display mode of the output apparatus, and outputs the video signal and the first audio signal converted, and
   the the signal processor is configured to calculate the delay time, when the form into which the first interface converts the video signal and the first audio signal changes.

4. The video signal output apparatus according to claim 1, further comprising:
   an audio processor configured to delay the second audio signal received by the second interface from one output apparatus selected from the plurality of output apparatuses by a delay time corresponding to the time difference indicated by the synchronization information of the one output apparatus, and output, to outside, the second audio signal delayed.

5. The video signal output apparatus according to claim 1, wherein the first interface is configured to output the video signal and the first audio signal in accordance with High-Definition Multimedia Interface (HDMI® (registered trademark)) standard, and
   the second interface is configured to receive the second audio signal by an audio return channel (ARC) in the HDMI® standard.

6. A control method performed by a video signal output apparatus connected to a plurality of output apparatuses each of which performs video signal processing for displaying video and audio signal processing for outputting audio, the control method comprising:
   outputting a video signal and a first audio signal to each of the plurality of output apparatuses;
   receiving a second audio signal generated as a result of each of the plurality of output apparatuses performing the audio signal processing on the first audio signal output;
   obtaining synchronization information indicating a time difference between a time required for the video signal processing and a time required for the audio signal processing by each of the plurality of output apparatuses;
   calculating a delay time for reducing a time difference between respective timings of displaying the video by the plurality of output apparatuses, using a timing at which the second audio signal is received from each of the plurality of output apparatuses and the synchronization information obtained; and
   delaying the video signal and the first audio signal by the delay time calculated.

7. A non-transitory computer-readable recording medium having a program recorded thereon for causing a computer to execute the control method according to claim 6.

* * * * *